(12) United States Patent
Zhao et al.

(10) Patent No.: US 12,234,306 B2
(45) Date of Patent: Feb. 25, 2025

(54) METHOD TO PREPARE POLYMER MATERIALS WITH INTERLOCKED POROUS STRUCTURES BY FREEZING AND DEMULSIFICATION OF EMULSION

(71) Applicant: ZJU-HANGZHOU GLOBAL SCIENTIFIC AND TECHNOLOGICAL INNOVATION CENTER, Zhejiang (CN)

(72) Inventors: Qian Zhao, Hangzhou (CN); Di Chen, Hangzhou (CN); Yongbo Jiang, Hangzhou (CN); Tao Xie, Hangzhou (CN)

(73) Assignee: ZJU-HANGZHOU GLOBAL SCIENTIFIC AND TECHNOLOGICAL INNOVATION CENTER, Hangzhou (CN)

( * ) Notice: Subject to any disclaimer, the term of this patent is extended or adjusted under 35 U.S.C. 154(b) by 746 days.

(21) Appl. No.: 17/319,011

(22) Filed: May 12, 2021

(65) Prior Publication Data
US 2021/0355252 A1 Nov. 18, 2021

(30) Foreign Application Priority Data
May 13, 2020 (CN) .......................... 202010402402.X (51) Int. Cl.
*C08J 9/28* (2006.01)
*B01D 39/16* (2006.01)
(Continued)

(52) U.S. Cl.
CPC .......... *C08F 20/14* (2013.01); *B01D 39/1623* (2013.01); *C08F 20/18* (2013.01);
(Continued)

(58) Field of Classification Search
CPC ......... B01D 39/1623; C08J 9/283; C08J 9/26; C08J 9/28; C08F 20/14; C08F 20/18
See application file for complete search history.

(56) References Cited

PUBLICATIONS

Hou, Y. et al. Emulsion Lyophilization as a Facile Pathway to Fabricate Stretchable Polymer Foams Enabling Multishape Memory Effect and Clip Application. ACS Appl. Mater. Interfaces 2019, 11, 32423-32430 (Year: 2019).*
(Continued)

*Primary Examiner* — Christina H. W. Rosebach
(74) *Attorney, Agent, or Firm* — Jiwen Chen; Joywin IP Law PLLC (57) ABSTRACT

The present invention provides a method to prepare polymer materials with interlocked porous structures by freezing and demulsification, which includes: (1) Preparing an emulsion containing uncrosslinked polymers and crosslinking agents. The uncrosslinked polymers are presented in the organic phase, and the crosslinking agents are presented in the organic phase or water phase. Under freezing, the demulsification is occurred which leads to the interaction between polymers and crosslinking agents, and the crosslinked materials are obtained. (2) After removing the ice crystals, polymer materials with interlocked porous structures are synthesized. The method provided by the present invention is simple to operate, and can well adjust the porous structures of obtained porous polymer materials. In addition, it is suitable for large scale manufacturing. At the same time, this process can form different functional porous polymer materials by simply changing the used monomers. Particularly, it can prepare melt-blown fabrics with antibacterial property, high-throughput vertical porous structures and high-temperature sterilizable feature, therefore, it can be used to manufacture medical products such as masks.

7 Claims, 3 Drawing Sheets

(51) Int. Cl.
*C08F 20/14* (2006.01)
*C08F 20/18* (2006.01)

(52) U.S. Cl.
CPC .............. *C08J 9/28* (2013.01); *C08J 9/283* (2013.01); *B01D 2239/0442* (2013.01); *B01D 2239/0618* (2013.01); *B01D 2239/0622* (2013.01); *C08J 2201/0484* (2013.01); *C08J 2333/08* (2013.01)

(56) References Cited

PUBLICATIONS

Hou, Y. et al. Supporting information—Emulsion Lyophilization as a Facile Pathway to Fabricate Stretchable Polymer Foams Enabling Multishape Memory Effect and Clip Application. ACS Appl. Mater. Interfaces 2019, 11, 32423-32430 (Year: 2019).*

Niu, X. et al. Homogeneous Chitosan/Poly(L-Lactide) Composite Scaffolds Prepared by Emulsion Freeze-Drying. Journal of Biomaterials Science 23 (2012) 391-404 (Year: 2012).*

* cited by examiner

METHOD TO PREPARE POLYMER MATERIALS WITH INTERLOCKED POROUS STRUCTURES BY FREEZING AND DEMULSIFICATION OF EMULSION

This application claims the priority benefit of Chinese Application No. 202010402402.X, filed May 13, 2020, which is hereby incorporated by reference.

TECHNICAL FIELD

The present invention relates to the field of manufacturing of porous polymer materials. In particularly, it is related to a method for preparing polymer materials with interlocked porous structures through freezing and demulsification of emulsions. In addition, it includes usages of obtained porous polymer materials.

BACKGROUND OF THE TECHNOLOGY

Polymers with interlocked porous structures are well used in various applications due to their large specific surface areas and low apparent densities. Typically, they can be used as filters to replace the melt-blown fabrics of medical masks, or can be utilized as water absorbing layers in mops. Specifically, the conventional melt-blown fabrics are made from hot pressing of linear polypropylene fiber. However, such method of hot pressing of linear polypropylene fiber exhibits a poor ability to control the pore structures. Furthermore, due to the use of thermoplastic polypropylene as a raw material, it can only use chemical disinfectants such as ethylene oxide to disinfect the prepared masks. As a result, the mask needs more than a week of transition time for the chemical disinfectants to volatilize completely, which delays the supply of medical masks. In another example, widely used collodion is usually made by polyvinyl alcohol which contains starch. By dissolving the sacrificial starch and crosslinking by formaldehyde, porous collodion is obtained. However, such process will produce a large amount of high-VOC waste water and cause existing enterprises of this type to close due to environmental protection issues.

Besides the previous methods, foaming and templating are the other two general methods to prepare porous polymer materials. By adding foaming elements, including chemical foaming agents or gases, to the polymer matrix material, the physical or chemical changes of the foaming elements are used to achieve the generation of a porous structure, thereby preparing a polymer through-hole material. However, this type of method usually requires the polymer body to have a higher viscosity to fix the generated porous structure, and at the same time, the ability to control the pore structure morphology is low, which limits the functional application of the material.

In another aspect, traditional template and phase separation methods can both prepare polymer through-hole materials, but the process flow is often complicated and cannot meet the requirements of large-scale manufacturing. Furthermore, the removal of templates will cause huge environmental pollution.

Different from above-mentioned approaches, the new porous material preparation method represented by the freezing casting method can realize the shaping of the porous structure through the phase change of the solvent, and the morphologies of the obtained porous structure, such as the pore size and porosity, can be conveniently adjusted by adjusting the freezing method. In the traditional method, water is often used as a solvent, and the obtained polymer through-hole material has poor water and weather resistance, but if an organic solvent is used, it will cause greater environmental problems. At the same time, this type of method is limited to laboratory preparation and cannot meet the needs of large scale manufacturing.

Therefore, emulsion which contains hydrophobic components is used to form porous materials by ice-templating process. For a typical protocol, freezing will induce the aggregation of polymer which will make materials change into porous state after freezing drying. Because of using hydrophobic polymer, it will have good water resistance. Yet, this method requires the polymer having high modulus or stiffness to support the porous structure which limits the development of this method. On the other hand, the freezing drying process is time consuming, energy inefficient and not fit for large scale production.

SUMMARY OF THE PRESENT INVENTION

The object of the present invention is to provide a method to prepare interlocked porous polymer materials by freezing and demulsification of emulsions, and to demonstrate the applications of obtained materials. The method provided by the present invention is easy to operate and adjust the porous structures of obtained polymer materials. Additionally, it is suitable for large scale manufacturing. Furthermore, the developed method can synthesize porous polymer materials with different properties by adjusting the monomers.

The specific process according to the present invention is as follows.

(1) Preparing an emulsion containing uncrosslinked polymers and crosslinking agents. The uncrosslinked polymers are presented in the droplets of the organic phase of the emulsion, and the crosslinking agents are presented in the droplets of the organic phase of the emulsion or water phase. Under freezing conditions, the demulsification occurs which leads to the interaction between polymers and crosslinking agents;

(2) After removing the ice crystals, polymer materials with interlocked porous structures are synthesized.

In the emulsion, the polymer is wrapped in the latex particles, and the crosslinking agents are dispersed in the water phase, thus the polymers will not be crosslinked and the system exists stably. When the pores are made by freezing, the dispersed phase changes from water to ice crystals. A large number of ice crystals demulsify the polymer latex particles, and make the crosslinking agent dissolved in the water phase squeeze out, enriching on the polymer surface, satisfying the cross-linking conditions and producing a cross-linked structure, which can stabilize the porous morphology.

Single or multiple emulsifiers are used to form the emulsion in step (1). Preferably, the emulsifier can be selected from the brands of A-980, A-6828, 102, T-40, A-246, DSB, etc.

In order to defoam the emulsion, a single or multiple defoaming agents can be added in step (1). Preferably, the defoaming agent can be, but not limited to, polydimethylsiloxane, fatty acid glyceride and polyether defoaming agent.

In step (1), the polymer is selected from one or a combination of at least two of polyacrylates, polyurethanes, epoxy resins, polycarbonates or polystyrenes. The chosen polymer needs the potential abilities to be crosslinked. In the meantime, the polymers in the oil phase of the emulsion can be directly added, or the reactive monomer in the oil phase can be polymerized in-situ under the action of the initiator.

Furthermore, a variety of reactive monomers can be used for in-situ polymerization. As a preference, it can be selected but not limited from methyl acrylate, ethyl acrylate, butyl acrylate and so on. In addition, the monomer can be polymerized by thermal initiators, redox initiators, or photo-initiators. Among them, the thermal initiators can be, but not limited to dibenzoyl peroxide or azobisisobutyronitrile. The redox initiators can be, but not limited to ammonium persulfate or potassium persulfate to form oxidation systems, and sodium bisulfite or tetramethylethylenediamine to form reduction systems. The photo-initiators can be, but not limited to 2,4,6-(trimethylbenzoyl) diphenyl phosphine oxide, or 4-dimethylamino-ethyl benzoate. The triggered light wavelength can be 200-500 nm. Additionally, the reaction can occur under different temperatures. Preferably, the temperature is set at room temperature to 70° C., and the reaction time is 2-12 hours.

Furthermore, if the polymer is formed by in-situ polymerization, other functional monomers can be added into the emulsion, and the properties of the obtained polymers can be changed by copolymerization. As a preference, the glass transition temperatures can be changed by using methyl methacrylate, styrene, etc. The antibacterial and antiviral properties can be enhanced by utilizing polyion, zwitterion monomers, etc. Further preferred, zwitterion monomers can be 3-(methacrylamido)propyl trimethylammonium chloride, N,N-dimethylamino ethyl acrylate, methacrylic acid sulfobetaine, carboxylic acid beet Alkali methacrylate.

Furthermore, in order to smoothly trigger the crosslinking process in step (2), the polymer in organic phase needs groups which can be crosslinked. Preferably, the group can be, but it is not limited to, the diacetone acrylamide, glycidyl acrylate, single-ended epoxy acrylate.

Further, in order to crosslink the polymer in the organic phase, single or multiple crosslinking agents need to be added into the water phase. Preferably, the crosslinking agents can be, but not limited to, adipic hydrazide, hexamethylene diamine, triethylenetetramine, dithiothreitol, methylene bisacrylamide.

In the present invention, the emulsion can be frozen at different temperatures, and the freezing temperature is below −5° C. Preferably, the freezing temperature is between −180 to −50° C. As a preference, the freezing time is 0.5-10 minutes. The size of ice crystals can be adjusted by freezing temperature which will influence the pore size of final obtained porous polymer materials. Further optimization, the emulsion can be directional frozen by cooling stage, or undirectional frozen by refrigerator.

In the present invention, the emulsion can be frozen in different shapes which will be suitable for large scale manufacturing. For optimization, the emulsion can be cast into a thin film, or molded into a three-dimensional object which can be further changed into different shapes of porous polymer materials.

In the present invention, the crosslinking process in step (2) can be realized by direct freezing or light exposure under freezing.

In the present invention, the ice crystals in step (2) can be removed by variety of ways. In particular, it can be removed by freezing drying or directly melting. For optimization, the method of removing ice crystals can be drying in air, vacuum drying or heating.

The porous structures of obtained polymer materials in the present invention can be adjusted by adding additives or freezing on substrates with different wettabilities. For optimization, the additives are, but not limited to, polyvinyl alcohol, polyethylene glycol, or sodium polyacrylate. The substrate wettabilities can be manipulated by coating polydimethylsiloxane, sodium polymethacrylate sulfonate, sodium polyacrylate and polyvinyl alcohol.

Especially, the porous polymer material obtained in step (2) has a vertical porous structure.

The present invention also provides applications of obtained porous polymer materials. Specifically, they can be used as filters, mechanical damping materials, sound insulation materials, shock-absorbing materials, shape memory materials (using its own glass transition temperature), antibacterial materials, antiviral materials or absorbing materials. Further, the obtained porous polymer materials can replace the melt-blown fabrics, or be used as tissue clips and collodion.

The method for preparing polymer materials with interlocked porous structures by freezing and demulsification established in the present invention can be adapted to a variety of emulsion systems. As a typical example, the following formulations can be used (expressed by weight part in raw materials):

| | |
|---|---|
| ethyl acrylate | 20-25 parts |
| butyl acrylate | 20-25 parts |
| Crosslinking agent | 0.2-3 parts |
| Emulsifier | 2-3 parts |
| Anti-foaming agent | 0.05-0.1 parts |
| Initiator | 0.1-0.5 parts |
| Water | 50 parts |

Furthermore, the method for preparing polymer materials with interlocked porous structures by freezing and demulsifying in the present invention can be applied to a continuous process and can be used to produce melt-blown fabrics.

The polymer materials with interlocked porous structures can post crosslinked by other auxiliary approaches (such as ultraviolet light, etc.) which can strengthen the walls of pores and achieve the switch of the functionalities. The direction of porous structures is determined by the direction of ice crystal. By changing the size of the ice crystals can achieve the control of pore size. By adjusting the distribution of the ice crystal size in different regions can switch the functionalities of obtained porous polymer materials.

The method to prepare polymer materials with interlocked porous structures based on freezing and demulsification is to add crosslinking agents to the water phase. Through the growth of ice crystals, the crosslinking agents are squeezed into the surface of the polymer organic latex which can make polymers crosslinked under certain conditions. Therefore, the porous morphologies are well fixed. Compared with the traditional methods, this method is simple, practical, and reduces the requirements on mechanical properties of used polymers. On the other hand, the pore formation process established by the present invention is simple and environmentally friendly. The obtained material properties can be adjusted through different molecular design and freezing conditions. In addition, it can construct vertical porous structures with large fluid flux. The copolymerization of functional monomers can conveniently make obtained porous polymer materials with antibacterial and adsorption properties. Furthermore, the developed method can prepare thermoset with interlocked porous structures, so that the materials can bear high temperature and high pressure to sterilize. These advantages can overcome the technical limitations in present manufacturing industry of porous materials. Especially, the developed method can be used for producing medical supplies, such as medical masks and isolation suits.

DETAILED EMBODIMENTS OF THE PRESENT INVENTION

The present invention will be further described below with the embodiments, but the ranges of protection claimed in the present invention is not limited to the embodiments.

Figure 1:
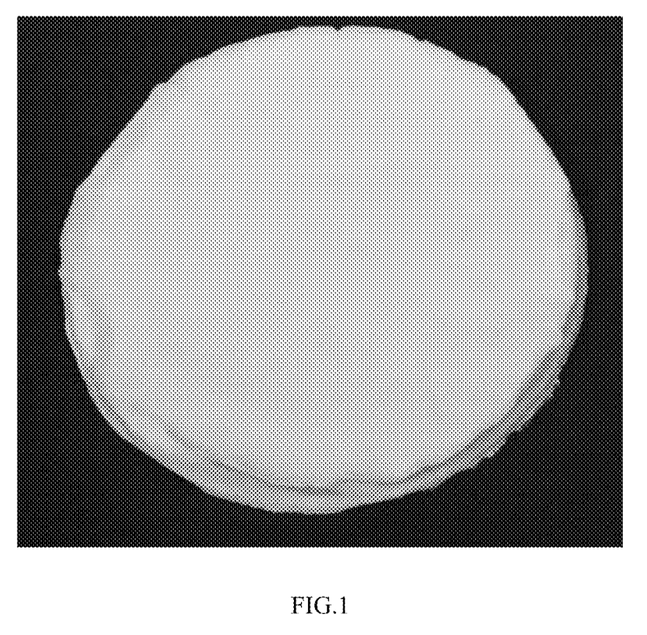
FIG. 1 is a photograph of obtained porous polymer material in example 1.
Figure 2:
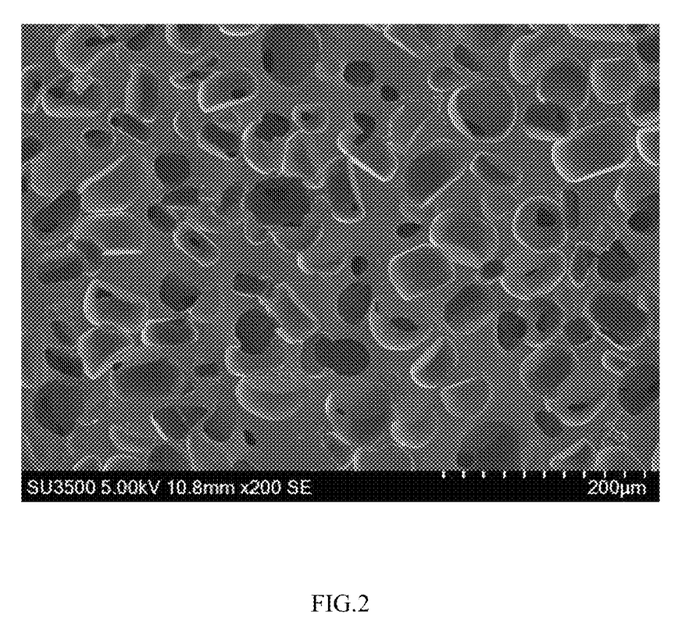
FIG. 2 is a SEM image of the polymer material with interlocked porous structures in example 1.
Figure 3:
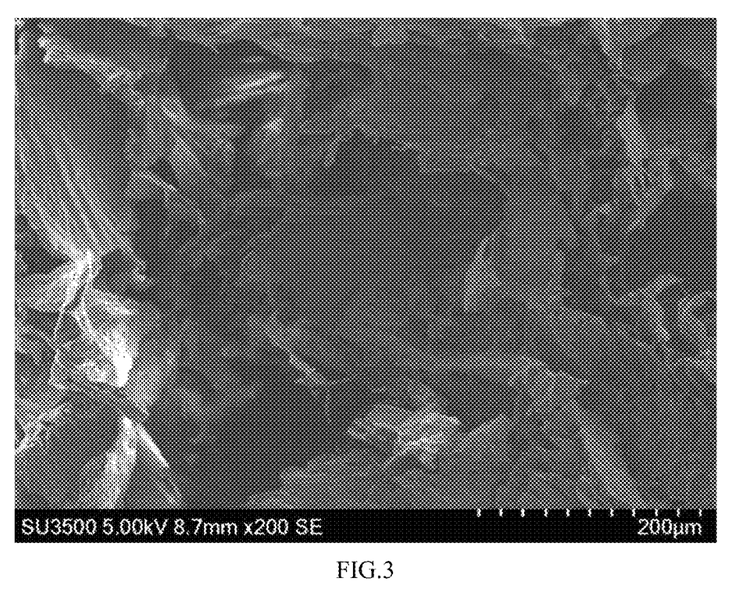
FIG. 3 is a SEM image of the polymer material with interlocked porous structures in example 2.
Figure 4:
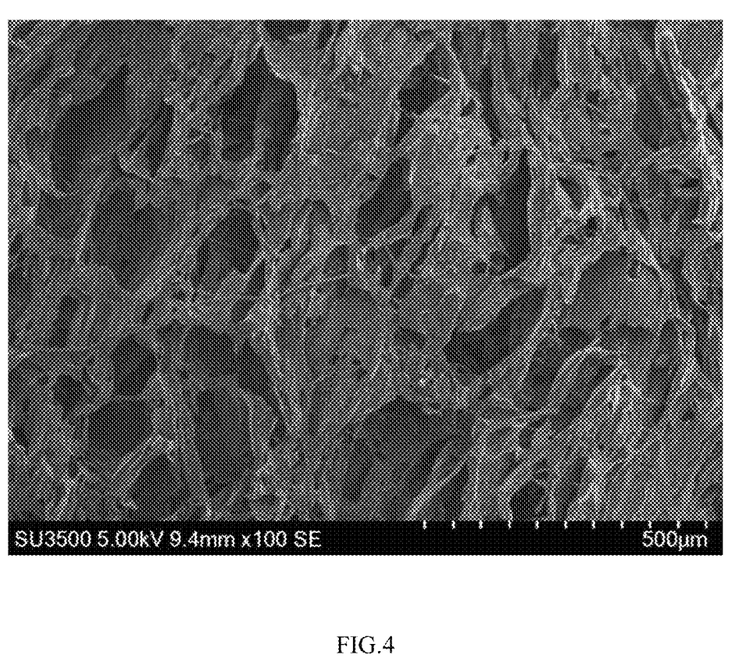
FIG. 4 is a SEM image of the polymer material with interlocked porous structures in example 3.
Figure 5:
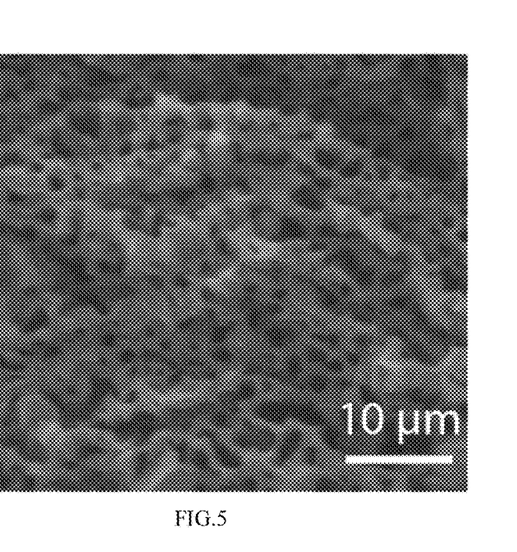
FIG. 5 is a SEM image of the polymer material with small pores in example 6.
Figure 6:
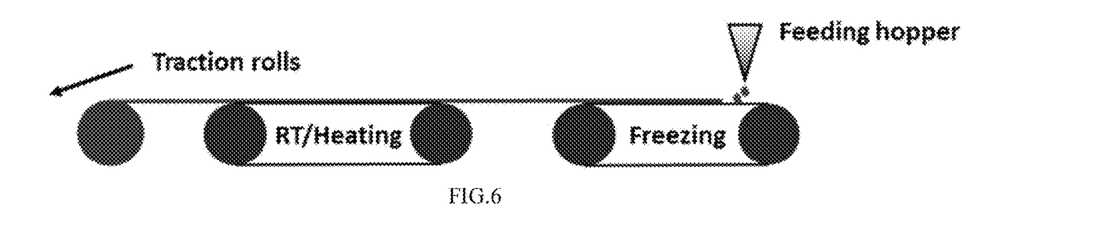
FIG. 6 is a schematic diagram of continuously preparing porous polymer materials in example 7.
Figure 7:
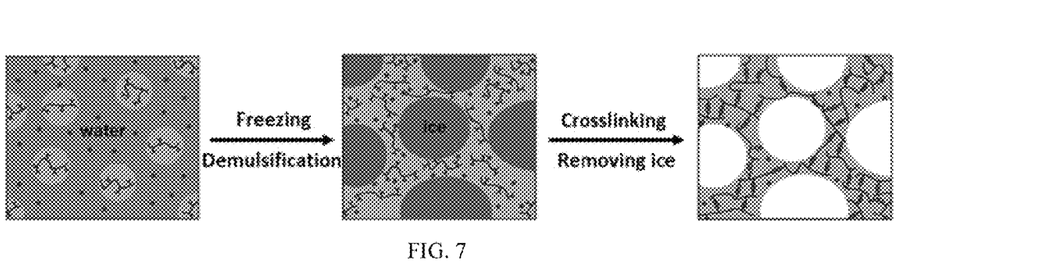
FIG. 7 is a schematic diagram of the preparing method of polymer through-hole materials.

The schematic diagram of the method for preparing polymer materials with interlocked porous structures by freezing and demulsification is shown in FIG. 7.

Example 1 (Using Diacetone Acrylamide and Adipic Acid Dihydrazide to Form Crosslinking Network)

The Used Raw Materials and their Ratios:

| Reagent | Dosage/g | Reagent | Dosage/g |
|---|---|---|---|
| Primer liquid: | | | |
| Deionized water | 80.00 | Emulsifier A-980 | 0.40 |
| Ammonium persulfate | 0.30 | Emulsifier A-6828 | 0.60 |
| Sodium Bisulfite | 0.30 | Sodium bicarbonate | 0.35 |
| Butyl acrylate | 8.00 | | |
| Pre-emulsion liquid: | | | |
| Deionized water | 80.00 | Emulsifier 246 | 1.00 |
| Ammonium persulfate | 0.32 | Emulsifier A151 | 1.00 |
| Emulsifier 102 | 3.00 | Diacetone acrylamide | 1.00 |
| Emulsifier T-40 | 3.00 | Acrylonitrile | 15.00 |
| Butyl acrylate | 88.00 | Ethyl acrylate | 90.00 |
| Initiation system: | | | |
| Sodium Bisulfite | 0.32 | Sodium Dodecyl Sulfonate | 0.50 |
| Deionized water | 15.00 | | |
| Post-treatment liquid: | | | |
| Ammonia | 1.50 | Adipic acid hydrazide | 0.60 |
| Deionized water | 7.00 | | |

Preparation Steps:

(1) The primer was prepared in a reaction container according to the formulas, and stirred at 60° C. for 20 minutes until appearing light blue color. Then, according to pre-emulsion liquid formula, emulsifiers and other additives were added to the water phase, and stirred until completely dissolved. Next, other monomers were added to the previous liquid and emulsified under large shearing rate to form stable pre-emulsion liquid. Finally, after the blue light of the primer appeared, the pre-emulsion liquid was gradually added into the primer. The total dripping time was 4 hours.

(2) 30 minutes after the start of the pre-emulsion dripping, the initiator was dripped into the pre-emulsion and the dripping time was 4 hours.

(3) After addition of the pre-emulsion liquid and the initiator, the reaction was initiated and continued for 2 hours. Then, the temperature was lowered to 45° C. The post-treatment liquid was added and kept for 15 minutes. Then the product was filtered out.

(4) Above acrylic emulsion was poured into a container and frozen at −100° C. for 10 minutes. After removing the ice at room temperature, the polyacrylate material with interlocked porous structures was obtained.

Example 2 (Using Glycidyl Acrylate and Triethylenetetramine to Form Crosslinking Network)

The Used Raw Materials and their Ratios:

| Reagent | Dosage/g | Reagent | Dosage/g |
|---|---|---|---|
| Primer liquid: | | | |
| Deionized water | 90.00 | Span 80 | 0.40 |
| Dibenzoyl peroxide | 0.50 | Tween 60 | 0.60 |
| Ethyl acrylate | 8.00 | Sodium bicarbonate | 0.35 |
| Pre-emulsion liquid: | | | |
| Deionized water | 80.00 | Tween 40 | 3.00 |
| Emulsifier 102 | 3.00 | Glycidyl acrylate | 5.00 |
| Butyl acrylate | 80.00 | Ethyl acrylate | 92.00 |
| Post-treatment liquid: | | | |
| Ammonia | 1.50 | Triethylenetetramine | 3.00 |
| Deionized water | 7.00 | | |

The total preparation steps are similar to those in Example 1.

(1) The primer was prepared in a reaction container according to the formulas, and stirred at room temperature for 20 minutes until appearing light blue color. Then, according to pre-emulsion formula, emulsifiers and other additives were added to the water phase, and stirred until completely dissolved. Next, other monomers were added to the previous liquid and emulsified under large shearing rate to form a stable pre-emulsion liquid. Finally, after the blue light of the primer appeared, the pre-emulsion was gradually added into the primer liquid. The total dripping time was 6 hours.

(2) After completing the previous process, the temperature was increased to 70° C. to initiate the polymerization. The reaction lasted for 24 hours, and then recover to room temperature.

(3) The post-treatment liquid was added and stirred for 15 minutes. Then, the products were filtered out.

(4) Above acrylic emulsion was poured into a container and frozen at −50° C. for 5 minutes. After removing the ice by freezing drying, the polymer material with interlocked porous structures was obtained.

Example 3 (Using Glycidyl Methacrylate and Dithiothreitol to Form Crosslinking Network)

The Used Raw Materials and their Ratios:

| Reagent | Dosage/g | Reagent | Dosage/g |
|---|---|---|---|
| Primer liquid: | | | |
| Deionized water | 100.00 | Emulsifier A-980 | 0.40 |
| Azobisisobutyronitrile | 0.80 | Emulsifier 246 | 1.00 |
| Methyl methacrylate | 10.00 | Sodium carbonate | 0.10 |
| Pre-emulsion liquid: | | | |
| Deionized water | 50.00 | Emulsifier 246 | 1.00 |
| Azobisisobutyronitrile | 0.35 | Emulsifier A151 | 1.00 |
| Emulsifier 102 | 3.00 | Glycidyl methacrylate | 5.00 |
| Methyl acrylate | 100.00 | Methyl methacrylate | 50.00 |
| Post-treatment liquid: | | | |
| Sodium acetate | 5.00 | Dithiothreitol | 5.00 |
| Deionized water | 10.00 | | |

Preparation Steps:

(1) The primer was prepared in a reaction container according to the formulas, and stirred at 40° C. until appearing light blue color. Then a stable pre-emulsion liquid was made according to the pre-emulsion liquid formula. The pre-emulsion liquid was added into the reaction container by dripping after appearing light blue color, and the total process was 6 hours.

(2) 10 minutes after the start of the pre-emulsion dripping, the temperature was increased to 60° C., and whole process was 6 hours.

(3) After the addition of the pre-emulsion liquid, the reaction was continuously reacted for 6 hours, then the temperature was decreased to room temperature. The post-treatment liquid was added and stirred for 5 minutes. The obtained product was filtered out.

(4) Above acrylic emulsion was poured into a container and frozen at −180° C. for 0.5 minutes. After removing the ice by directly heating, the polymer material with interlocked porous structures was obtained.

Example 4 (Adjusting Glass Transition Temperature of Obtained Materials)

By adding different monomers to the original precursor, the glass transition temperature of obtained polymers can be adjusted.

The Used Raw Materials and their Ratios:

| Reagent | Dosage/g | Reagent | Dosage/g |
|---|---|---|---|
| Primer liquid: | | | |
| Deionized water | 90.00 | Emulsifier A-980 | 0.40 |
| Ammonium persulfate | 0.50 | Emulsifier A-6828 | 1.00 |
| Sodium Bisulfite | 0.35 | Sodium bicarbonate | 0.10 |
| Butyl acrylate | 8.00 | | |
| Pre-emulsion liquid: | | | |
| Deionized water | 100.00 | Emulsifier 246 | 1.00 |
| Ammonium persulfate | 0.40 | Emulsifier A151 | 1.00 |
| Emulsifier 102 | 3.00 | Diacetone acrylamide | 1.00 |
| Emulsifier T-40 | 3.00 | Acrylonitrile | 15.00 |
| Butyl acrylate | 88.00 | Styrene | 120.00 |
| Initiation system: | | | |
| Sodium Bisulfite | 0.32 | Sodium Dodecyl Sulfonate | 0.50 |
| Deionized water | 15.00 | | |
| Post-treatment liquid: | | | |
| ammonia | 1.50 | Adipic acid hydrazide | 0.60 |
| Deionized water | 7.00 | | |

Preparation Steps:

(1) The primer was prepared in the kettle by using the raw materials according to the primer formula, then the primer was stirred and kept at 60° C. for 20 minutes, until blue light appeared; then according to the pre-emulsification formula, emulsifiers and other additives were added into the water, and after they are completely dissolved, other monomers are added and emulsified in a high-shear emulsifier to form a stable pre-emulsion liquid. The pre-emulsion liquid was added dropwise to the kettle after the blue light of the primer appeared. The dropping time was 4 hours;

(2) 30 minutes after the start of the pre-emulsion liquid dripping, the initiator was dripped in for 4 hours.

(3) After addition of the pre-emulsion liquid and the initiator, the reaction was initiated and continued for 2 hours. Then, the temperature was lowered to 45° C. The post-treatment liquid was added and kept for 15 minutes. Then the product was filtered out.

(4) Above acrylic emulsion was poured into a container and frozen at −100° C. for 10 minutes. After removing the ice by melting and evaporation at room temperature, the polyacrylate material with interlocked porous structures was obtained. Such polymer has different glass transition temperatures from the polymer obtained in Example 1. Specifically, the glass transition temperature of the polymer obtained in Example 1 was 20° C., and the glass transition temperature of the material prepared in this example was 61° C.

Example 5 (Adjusting Porous Morphologies by Additives)

The porous structures of obtained polymer materials are controlled by adding hydrophilic additives to the original formulas.

The typical reagents and their proportions are as follows:

| Reagent | Dosage/g | Reagent | Dosage/g |
|---|---|---|---|
| Primer liquid: | | | |
| Deionized water | 180.00 | Emulsifier A-980 | 0.50 |
| Ammonium persulfate | 0.50 | Emulsifier A-6828 | 0.40 |
| Sodium Bisulfite | 0.35 | Sodium bicarbonate | 0.4 |
| Butyl acrylate | 8.00 | Polyvinyl alcohol | 2.0 |

-continued

| Reagent | Dosage/g | Reagent | Dosage/g |
|---|---|---|---|
| Pre-emulsion liquid: | | | |
| Deionized water | 100.00 | Emulsifier 246 | 1.00 |
| Ammonium persulfate | 0.40 | Emulsifier A151 | 1.00 |
| Emulsifier 102 | 3.00 | Diacetone acrylamide | 1.00 |
| Emulsifier T-40 | 3.00 | Acrylonitrile | 15.00 |
| Butyl acrylate | 88.00 | Ethyl acrylate | 90.00 |
| Initiation system: | | | |
| Sodium Bisulfite | 0.32 | Sodium Dodecyl Sulfonate | 0.50 |
| Deionized water | 15.00 | | |
| Post-treatment liquid: | | | |
| ammonia | 1.50 | Adipic acid hydrazide | 0.60 |
| Deionized water | 7.00 | | |

Preparation Steps:

(1) The primer was prepared according to the formulas in a reaction container, and stirred at 60° C. for 20 minutes until appearing light blue color. Then, according to pre-emulsion formula, emulsifiers and other additives were added to the water phase, and stirred until completely dissolved. Next, other monomers were added to the previous liquid and emulsified under large shearing rate to form a stable pre-emulsion liquid. Finally, the pre-emulsion liquid was gradually added into the primer in the container. The total time was 4 hours.

(2) 30 minutes after the start of the pre-emulsion dripping, the initiator was dripped for 4 hours.

(3) After addition of the pre-emulsion and the initiator, the reaction was initiated and continued for 2 hours. Then, the temperature was lowered to 45° C. The post-treatment liquid was added and kept for 15 minutes. Then the product was filtered out.

(4) Above acrylic emulsion was poured into a container and frozen at −18° C. for 1 hour. After removing the ice at room temperature through melting and evaporation, the polyacrylate material with interlocked porous structures was obtained. The porosity of such polymer was different from the materials obtained in Example 1. Specifically, porosity of the material prepared in Example 1 was 45%, and the porosity of the material prepared in this example was 90%.

Example 6 (Adjusting Porous Morphologies by Changing Wettability of Used Substrates)

The used reagents and steps were the same as Example 1. The difference was that before step (4), the freezing stage was coated with polyvinyl alcohol. Then, the emulsion was frozen on this stage at −100° C. for 10 min. After removing the ice by drying at room temperature, the porous polymer material was obtained. In Example 1, the pore size of the material was 100 μm, while the pore size of the material prepared here was 1 μm.

Example 7 (Preparing Polymer Materials with Interlocked Porous Structures Continuously)

The used reagents and steps were the same as Example 2. The difference was that in step (4), the emulsion was casted rather than molded. The emulsion was frozen at −180° C. cooling platform on the track. After recovered to room temperature, the ice was melting and porous materials can be continuously produced.

Example 8 (Antibacterial Porous Polymer Material)

The used reagents and steps were the same as Example 1, except adding 20 g of acrylated betaine into the pre-emulsion liquid. After the ice crystals were removed by drying at room temperature, the obtained porous polymer materials will own antibacterial properties.

Example 9 (Shape Memory Porous Polymer Material)

The porous polymer materials prepared in Example 1 have a glass transition temperature of 20° C. The shape were manipulated above 20° C. and fixed when the temperature decreases to below 20° C. When the temperature rose above 20° C. again, the previous material recovered to its original shape, thus finishing one cycle of shape memory process.

Example 10 (Water Absorbent Collodion)

The used reagents and steps were the same as Example 1, except adding 50 g of sodium acrylate into the emulsion. By polymerized at 50° C. for 12 hours, the emulsion was cooled to room temperature. Then, it was poured into rectangular mold for freezing. After completely frozen, the system was recovered to room temperature, and the polymer material with interlocked porous structures was obtained after removing ice crystal by freezing drying. Such porous polymer materials had good water absorption property. After characterization, the obtained porous polymer material can absorb water over 10 times of its own weight. Therefore, it can be used in daily water absorption products.

The invention claimed is:

1. A method to prepare polymer materials with interlocked porous structures by freezing and demulsification of emulsion, comprising the following steps:
   (1) preparing an emulsion containing uncrosslinked polymers and crosslinking agents, wherein the uncrosslinked polymers are presented in an organic phase, and the crosslinking agents are presented in the organic phase or a water phase; under freezing, demulsification occurs and leads to interaction between the uncrosslinked polymers and the crosslinking agents; and
   (2) after removing ice crystals, obtaining polymer materials with interlocked porous structures;
   wherein, in step (1), the crosslinking agents are one or a combination of two of hexamethylene diamine, triethyl hydrazide, triethylenetetramine, dithiothreitol, or methylene bisacrylamide.

2. The method for preparing polymer materials with interlocked porous structures by freezing and demulsification according to claim 1, wherein the polymers used in step (1) are selected from one or a combination of two of polyacrylates, polyurethanes, epoxy resins, polycarbonate, or polystyrene; the polymers contain crosslinkable groups; the polymers are directly added to the organic phase or are obtained from the in-situ polymerization of reactive monomers under action of an initiator.

3. The method for preparing polymer materials with interlocked porous structures by freezing and demulsification according to claim 2, wherein the crosslinkable groups are diacetone acrylamide, glycidyl methacrylate, or epoxy acrylate.

4. The method for preparing polymer materials with interlocked porous structures by freezing and demulsification according to claim 2, wherein functional monomers are added at the same time if using in-situ polymerization of the reactive monomers to synthesize polymers.

5. The method for preparing polymer materials with interlocked porous structures by freezing and demulsification according to claim 1, wherein, in step (1), the freezing temperature is below −5° C., and the freezing approach is directional freezing or conventional random freezing.

6. The method for preparing polymer materials with interlocked porous structures by freezing and demulsification according to claim 1, wherein, in step (2), the ice crystals are removed by air drying, vacuum drying or heating.

7. The method for preparing polymer materials with interlocked porous structures by freezing and demulsification according to claim 1, wherein the porous structures are controlled by adding additives to the emulsion or by changing wettability of a substrate on which the emulsion is frozen.

* * * * *